(12) United States Patent
Shim et al.

(10) Patent No.: US 9,638,806 B2
(45) Date of Patent: May 2, 2017

(54) SYSTEM AND METHOD FOR DETECTING AMBIGUITIES IN SATELLITE SIGNALS FOR GPS TRACKING OF VESSELS

(71) Applicant: Korea Institute of Ocean Science And Technology, Gyeonggi-do (KR)

(72) Inventors: Woo Seong Shim, Daejeon (KR); Deuk Jae Cho, Daejeon (KR)

(73) Assignee: KOREA INSTITUTE OF OCEAN SCIENCE AND TECHNOLOGY, Gyeonggi-Do (KR)

(*) Notice: Subject to any disclaimer, the term of this patent is extended or adjusted under 35 U.S.C. 154(b) by 423 days.

(21) Appl. No.: 14/400,083

(22) PCT Filed: Nov. 15, 2012

(86) PCT No.: PCT/KR2012/009670
§ 371 (c)(1),
(2) Date: Nov. 10, 2014

(87) PCT Pub. No.: WO2013/168866
PCT Pub. Date: Nov. 14, 2013

(65) Prior Publication Data
US 2015/0153459 A1  Jun. 4, 2015

(30) Foreign Application Priority Data
May 11, 2012 (KR) .......................... 10-2012-0050229

(51) Int. Cl.
*G01S 19/40* (2010.01)

(52) U.S. Cl.
CPC .................................... *G01S 19/40* (2013.01)

(58) Field of Classification Search
CPC ........ G01S 19/40; G01C 21/165; G01C 21/00

USPC ...................................................... 342/357.23
See application file for complete search history.

(56) References Cited

U.S. PATENT DOCUMENTS

| | | | |
|---|---|---|---|
| 8,370,064 B1* | 2/2013 | Li | G01C 21/165 |
| | | | 701/479 |
| 2005/0010364 A1* | 1/2005 | Moser | G01C 21/165 |
| | | | 701/472 |
| 2009/0231161 A1* | 9/2009 | Malarky | G07B 15/063 |
| | | | 340/933 |

FOREIGN PATENT DOCUMENTS

| | | | | |
|---|---|---|---|---|
| JP | 2005031082 A | * | 2/2005 | .......... G01C 21/165 |
| KR | 10-0163215 | | 9/1998 | |
| KR | 10-0314987 | | 11/2001 | |
| KR | 10-0715178 | | 4/2007 | |
| KR | 10-0760979 | | 9/2007 | |

(Continued)

*Primary Examiner* — Harry Liu
(74) *Attorney, Agent, or Firm* — Dentons US LLP

(57) ABSTRACT

The present invention relates to a system for detecting ambiguities in a satellite signal for the GPS tracking of vessels, which includes: a GNSS receiving unit obtaining a vessel position using a plurality of satellites; a vessel position calculating unit calculating a second vessel position from a first vessel position after a specific amount of time elapses using dead-reckoning; a distance calculating unit calculating prediction distances between each of the satellites and the vessel and an error monitoring unit comparing the calculated prediction distances between the satellites and the vessel, and pseudoranges between the satellites and the GNSS receiving unit at the second vessel position, and monitoring for the occurrence of errors at the satellites on the basis of the existence of an increase in errors at each of the satellites.

13 Claims, 7 Drawing Sheets

(56) References Cited

FOREIGN PATENT DOCUMENTS

KR 10-0929598 11/2009

\* cited by examiner

SYSTEM AND METHOD FOR DETECTING AMBIGUITIES IN SATELLITE SIGNALS FOR GPS TRACKING OF VESSELS

RELATED APPLICATION DATA

This application is the Section 371 National Stage of PCT/KR2012/009670 filed Nov. 15, 2012, the entirety of which is incorporated herein by reference to the extent permitted by law. This application claims the benefit of priority to Korean Patent Application No. KR 10-2012-0050229, filed Nov. 5, 2012 the entirety of which is incorporated herein by reference to the extent permitted by law.

BACKGROUND OF THE INVENTION

Technical Field

The present invention relates, in general, to a system and method for detecting ambiguities in satellite signals for vessel positioning and, more particularly, to a system and method for detecting ambiguities in satellite signals for vessel positioning, which can detect ambiguities in satellite signals used to measure the position of a vessel.

Background Art

Periodically acquiring the position of a vessel for safe navigation of the vessel has been a continuous matter of interest for the development of new technology since the initiation of navigation on the sea. Recently, a Global Navigation Satellite System (GNSS) position acquisition system for acquiring the position of a user receiver based on the principle of triangulation by measuring the position of a satellite rotating around the earth and a distance from the satellite to the user receiver has been utilized as the most important vessel position acquisition means.

FIG. 1 is a block diagram showing a conventional system for determining a marine vessel position and providing an information service, and FIG. 2 is an internal plan view showing a conventional vessel position detection system.

For example, Korean Patent Application No. 10-1994-028555 discloses a system for determining the precise current position of each vessel on the sea and providing various types of information necessary for the vessel by utilizing a Global Positioning System (GPS) receiver and a Trunked Radio System (TRS), and a processing method of the system. Further, Korean Patent Application No. 10-2006-0045403 discloses a system and method for detecting the position of a vessel, which are capable of utilizing both a distance and an azimuth angle between a berth and a vessel, measured by a laser range finder 202 and then accurately providing the position and the sailing distance of the vessel.

Meanwhile, the acquisition of vessel position using a GNSS has been used in almost all vessels owing to an advantage that vessel positions may be acquired from the overall region of the earth regardless of weather conditions. However, such technology uses radio waves, and thus various types of technologies for acquiring information above a predetermined level required for vessels have been developed from the standpoint of precision and integrity. The elimination of ambiguities (plausibility) in positioning signals, which may occur because of artificial blocking of GNSS signals attributable to jamming signals that frequently and recently occur and errors in the positioning of a user receiver that occurs due to a failure in a satellite system, has been emphasized as an important issue.

The ambiguities in vessel position acquired by a user receiver using satellite radio waves was understood to be a concept included in the precision of vessel position in the past. However, it is assumed that the precision of positioning results caused by various error factors such as an inherent error in a GNSS system itself, an error caused by a delay on an ionized layer or an ionosphere at a distance by which radio waves reach a user receiver, an error in the user receiver, and a signal tracking error caused by multipath effects attributable to the surrounding environment of a user and other radio interference is represented by a probability that, when comparing calculated positioning information with true values of positioning information, the calculated positioning information will fall within a predetermined range. In this case, the precision of positioning information that can be guaranteed by the user receiver is provided based on the assumption of generally expected errors. Accordingly, a problem arises in that when an artificial error is applied thereto, the precision of positioning information cannot be guaranteed.

In this way, in a situation in which precision is obstructed, if the vessel position of a user corresponds to positioning information obtained when a vessel is rolled in several directions while deviating from a predetermined range, the user may definitely recognize the inaccuracy of information. However, when the vessel position corresponds to positioning information having a continuous error in a certain direction, it may be difficult for a user to promptly recognize that determined position information is inaccurate positioning information, and a problem arises in that ambiguities may be contained in such inaccuracy.

SUMMARY OF THE INVENTION

The present invention has been made keeping in mind the above problems, and an object of the present invention is to provide a system and method for detecting ambiguities in satellite signals for vessel positioning, which can compare the orbit information of GNSS satellites with the dead reckoning data of a vessel, thus detecting ambiguities.

In order to accomplish the above object, a system for detecting ambiguities in satellite signals for vessel positioning according to the present invention includes a Global Navigation Satellite System (GNSS) reception unit for acquiring a position of a vessel using a plurality of satellites; a vessel position calculation unit for calculating a second vessel position of the vessel after a specific time (t) has elapsed from a first vessel position of the vessel, using dead-reckoning; a distance calculation unit for calculating predicted distances between the respective satellites and the vessel, using position values of the respective satellites at the second vessel position, calculated using ephemeris information of the satellites, and a position value of the second vessel position; and an error monitoring unit for individually comparing the predicted distances between the respective satellites and the vessel calculated by the distance calculation unit, with pseudoranges between the respective satellites and the GNSS reception unit at the second vessel position, and then monitoring whether errors have occurred in the satellites depending on whether an error in each satellite has increased.

Further, the vessel position calculation unit may calculate the second vessel position using a bow azimuth angle and a ground speed of the vessel from the first vessel position.

Furthermore, the vessel may include a direction sensor for measuring the bow azimuth angle; and a speed sensor for measuring the ground speed.

Furthermore, the first vessel position may be a GNSS position previously acquired using the position values of the respective satellites when the GNSS reception unit is located at a point corresponding to the first vessel position.

Furthermore, the position values of the satellites at the second vessel position may be acquired by the GNSS reception unit calculating distance values of respective satellites that have moved from the first vessel position during the specific time (t) using the ephemeris information of the satellites.

Furthermore, the pseudoranges may be values calculated by the GNSS reception unit using signal measurement values.

In addition, a method for detecting ambiguities in satellite signals for vessel positioning according to the present invention includes acquiring a first vessel position of a vessel using a plurality of satellites; calculating a second vessel position of the vessel after a specific time (t) has elapsed from the first vessel position, using dead-reckoning; calculating predicted distances between the respective satellites and the vessel at the second vessel position using ephemeris information of the satellites; and monitoring whether errors have occurred in satellite signals depending on whether an error in each satellite has increased by individually comparing the predicted distances between the respective satellites and the vessel with pseudoranges between the respective satellites and a Global Navigation Satellite System (GNSS) reception unit at the second vessel position.

Further, acquiring the first vessel position may be configured to acquire the first vessel position using the following equation:

$$VP_a(T) = TA(\rho_{1a}, \rho_{2a}, \rho_{3a}, \rho_{4a})$$

where $VP_a(T)$ denotes the position of the vessel at point 'a', T denotes a time axis, TA denotes an abbreviated form of triangulation, meaning a function of receiving four pseudorange parameters and obtaining the position of the vessel from known satellite positions, and $(\rho_{1a}, \rho_{2a}, \rho_{3a}, \rho_{4a})$ denotes pseudoranges from point 'a' to the respective satellites.

Furthermore, calculating the second vessel position may be configured to calculate the second vessel position using the following equation:

$$VP_{DR}(T+t) = DR\{VP_a(T), HDG_a, SOG_a\}$$

where $VP_{DR}(T+t)$ denotes the position of the vessel at point 'b' to which the vessel has moved for the time t, via dead-reckoning, T denotes a time axis, DR denotes an abbreviated form of dead-reckoning, meaning a function of calculating the position of the vessel after time t has elapsed, using input parameter values, $VP_a(T)$ denotes the position of the vessel at point 'a', $HDG_a$ denotes a bow azimuth angle at point 'a', and $SOG_a$ denotes a ground speed at point 'a'.

Furthermore, calculating the distance may include a satellite position value calculation operation of calculating position values of respective satellites at the second vessel position using the ephemeris information of the satellites; and a predicted distance calculation operation of calculating predicted distances between the respective satellites and the vessel using the position values of the respective satellites at the second vessel position and a position value of the second vessel position.

Furthermore, the predicted distance calculation operation may be configured to calculate the predicted distances using the following equation:

$$Cal_{\rho 1,2,3,4b} = \sqrt{|VP_{DR}(T+t) - S_{1,2,3,4b}|^2}$$

where $Cal_{\rho 1,2,3,4b}$ denotes distances from the vessel to the respective satellites at point 'b', $VP_{DR}(T+t)$ denotes the position of the vessel at point 'b' to which the vessel has moved for the time t, using dead-reckoning, T denotes a time axis, and $S_{1,2,3,4b}$ denotes the calculated position values of the respective satellites at point 'b'.

Furthermore, monitoring whether errors have occurred may include a pseudorange acquisition operation of acquiring pseudoranges between the respective satellites and the vessel at the second vessel position; a distance comparison operation of individually comparing the predicted distances between the respective satellites and the vessel with the pseudoranges; and an error monitoring operation of monitoring whether errors have occurred in satellite signals depending on whether an error in each satellite has increased.

Furthermore, the pseudorange acquisition operation may be configured to acquire the pseudoranges using the following equation that represents a vessel position ($VP_b(T+t)$) corresponding to the second vessel position by a formula of distances between the vessel and the satellites:

$$VP_b(T+t) = TA(\rho_{1b}, \rho_{2b}, \rho_{3b}, \rho_{4b})$$

where $VP_b(T+t)$ denotes the position of the vessel at point 'b', T denotes a time axis, TA denotes an abbreviated form of triangulation, meaning a function of receiving four pseudorange parameters and obtaining the position of the vessel from known satellite positions, and $(\rho_{1b}, \rho_{2b}, \rho_{3b}, \rho_{4b})$ denotes pseudoranges from point 'b' to the respective satellites.

As described above, in accordance with a system and method for detecting ambiguities in satellite signals for vessel positioning according to the present invention, there is an advantage in that the orbit information of GNSS satellites is compared with dead-reckoning data obtained using the direction sensor and velocity sensor of a vessel, so that ambiguities that may be included in vessel position information and that present a high potential risk may always be monitored, and ambiguities that may be contained in satellite signals themselves may be detected using the monitored ambiguities.

DESCRIPTION OF THE REFERENCE NUMERALS IN THE DRAWINGS

Figure 1:
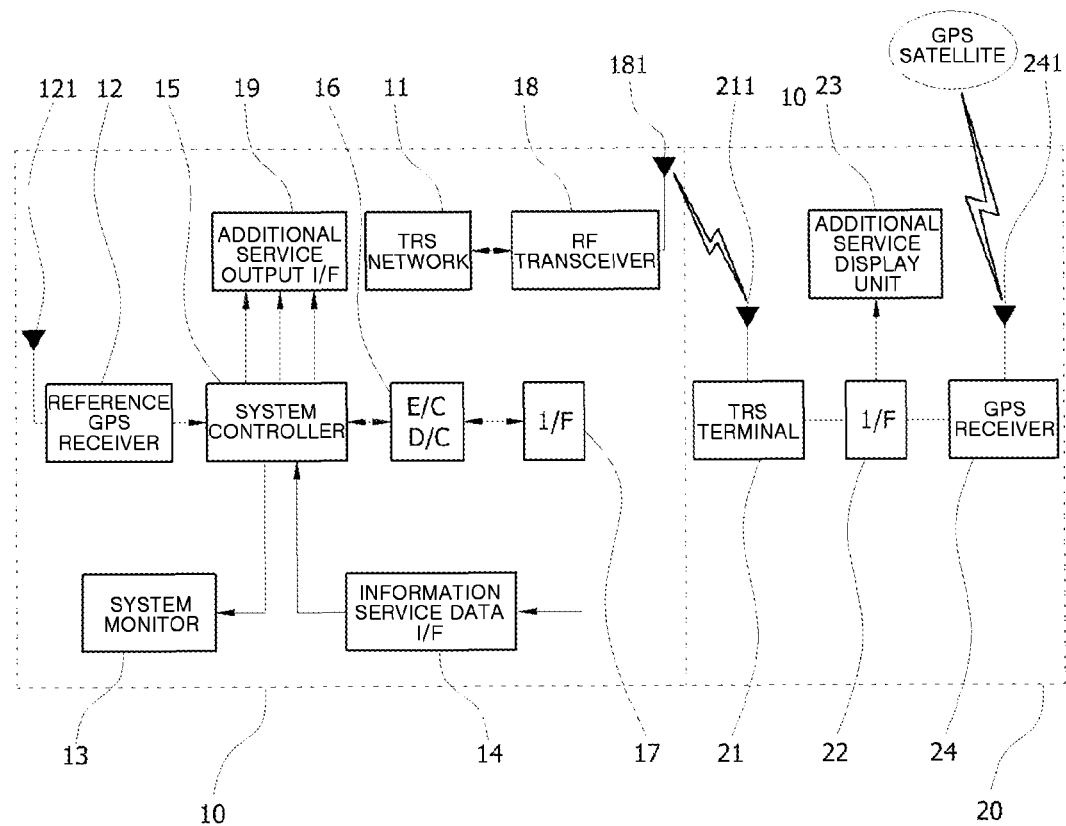
FIG. 1 is a block diagram showing a conventional system for determining the position of a marine vessel and providing an information service.
Figure 2:
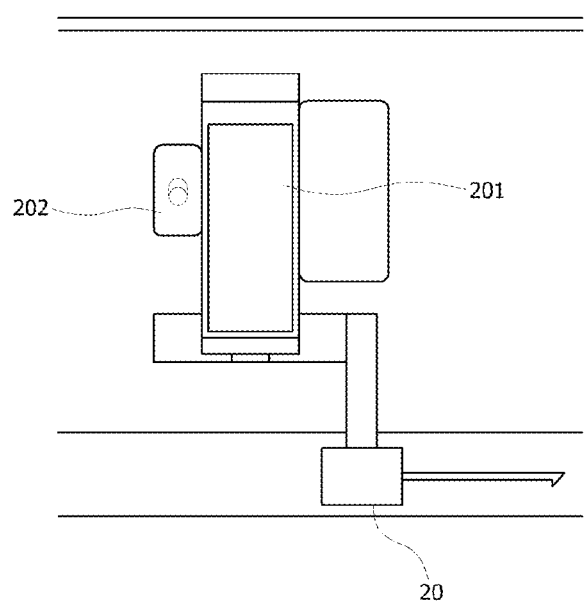
FIG. 2 is an internal plan view showing a conventional vessel position detection system.

100: GNSS reception unit
200: vessel position calculation unit

300: distance calculation unit
400: error monitoring unit
a: first vessel position
b: second vessel position
$S_{1a}, S_{2a}, S_{3a}, S_{4a}$: positions of satellites at a (first vessel position)
$S_{1b}, S_{2b}, S_{3b}, S_{4b}$: positions of satellites at b (second vessel position)
S10: first vessel position acquisition step
S20: second vessel position calculation step
S30: distance calculation step
S31: satellite position value calculation operation
S32: predicted distance calculation operation
S40: error monitoring step
S41: pseudorange acquisition operation
S42: distance comparison operation
S43: error monitoring operation

DETAILED DESCRIPTION OF THE PRESENTLY PREFERRED EMBODIMENTS

Hereinafter, embodiments of the present invention will be described in detail with reference to the attached drawings. It should be noted that the same reference numerals are used throughout the different drawings to designate the same components or parts. In the following description of the present invention, detailed descriptions of related known functions or configurations which have been deemed to make the gist of the present invention unnecessarily obscure will be omitted below.

Figure 3:
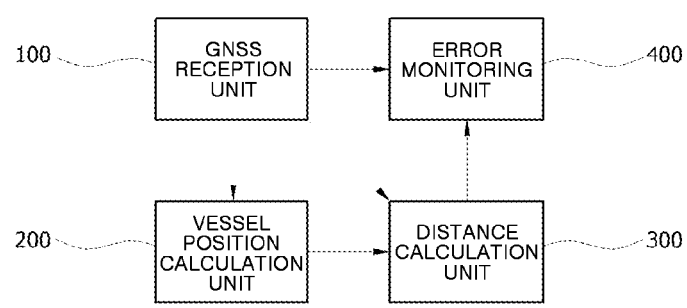
FIG. 3 is a configuration diagram showing a system for detecting ambiguities in satellite signals for vessel positioning according to an embodiment of the invention.

FIG. 3 is a configuration diagram showing a system for detecting ambiguities in satellite signals for vessel positioning according to the present invention.

As shown in FIG. 3, the system for detecting ambiguities in satellite signals for vessel positioning according to the present invention includes a Global Navigation Satellite System (GNSS) reception unit 100, a vessel position calculation unit 200, a distance calculation unit 300, and an error monitoring unit 400.

The GNSS reception unit 100 may acquire the vessel position of a vessel using a plurality of satellites.

The vessel position calculation unit 200 may calculate the second vessel position of the vessel after a specific time (t) has elapsed, from the first vessel position of the vessel, by using dead-reckoning.

Figure 4:
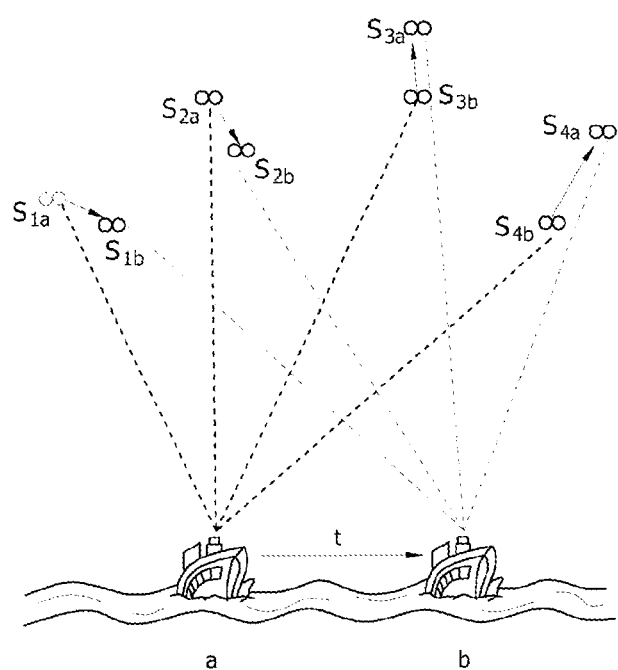
FIG. 4 is a diagram showing the positions of a vessel and satellites before and after a specific time (t) elapses according to an embodiment of the invention.

FIG. 4 is a diagram showing the positions of a vessel and satellites before and after a specific time (t) elapses according to the present invention.

As shown in FIG. 4, the vessel may sail between a first vessel position (a) and a second vessel position (b) during the specific time (t). At the first vessel position (a), a GNSS position may be acquired using the positions $S_{1a}, S_{2a}, S_{3a}$, and $S_{4a}$ of satellites and at the second vessel position (b), a GNSS position may be acquired using the positions $S_{1b}, S_{2b}, S_{3b}$, and $S_{4b}$ of the satellites after the respective satellites have moved along designated orbits (ephemerides) during the specific time (t).

The vessel position calculation unit 200 may calculate the second vessel position (b) using the bow azimuth angle and ground speed of the vessel from the first vessel position (a).

Here, as described above, the first vessel position (a) denotes the GNSS position previously acquired using the satellite position values $S_{1a}, S_{2a}, S_{3a}$, and $S_{4a}$ when the GNSS reception unit 100 is placed at the first vessel position (a). The bow azimuth angle and the ground speed are values respectively measured by a direction sensor and a speed sensor included in the vessel.

Since the GNSS reception 100 receives the orbit (ephemeris) information of each vessel, the precision of which is valid for a predetermined period of time longer than the specific time (t) (several hours or more), from individual satellites, and maintains the ephemeris information, it may immediately calculate positions to which the respective satellites have moved during the specific time (t). This shows that, when the positions $S_{1a}, S_{2a}, S_{3a}$, and $S_{4a}$ in FIG. 4 are the positions of respective satellites acquired by receiving satellite signals, the positions $S_{1b}, S_{2b}, S_{3b}$, and $S_{4b}$ denote values obtained by calculating distances that the satellites have moved during the specific time (t), using the ephemeris information of the corresponding satellites.

Generally, when unknown error factors increase in measurement values received from the satellites due to natural or artificial interference factors upon vessel positioning using the GNSS in the vessel, ambiguities are also increased. Such ambiguities may be monitored using dead-reckoning based on the bow azimuth angle and the ground speed that may always be acquired from the vessel at regular intervals of a specific time (t) corresponding to a relatively short period ranging from several seconds to several minutes.

The distance calculation unit 300 may calculate predicted distances between the respective satellites and the vessel using the position values $S_{1b}, S_{2b}, S_{3b}$, and $S_{4b}$ of the respective satellites at the second vessel position (b), calculated using the ephemeris information of the satellites, and a position value of the second vessel position (b).

Here, as described above, the position values $S_{1b}, S_{2b}, S_{3b}$, and $S_{4b}$ of the respective satellites at the second vessel position (b) are values obtained by the GNSS reception unit 100 calculating the distance values of respective satellites that have moved from the first vessel position during the specific time (t), using the ephemeris information of the satellites.

The error monitoring unit 400 may individually compare the predicted distances between the respective satellites and the vessel, which are calculated by the distance calculation unit 300, with pseudoranges between the respective satellites and the GNSS reception unit 100 at the second vessel position (b), and may monitor whether errors have occurred in the respective satellites depending on whether an error in each satellite has increased. Here, the pseudoranges may be values calculated by the GNSS reception unit 100 using signal measurement values.

That is, in accordance with the present invention, distances between the satellites and the vessel are obtained by respectively calculating the positions of the satellites and the vessel using dead-reckoning and ephemeris information during the specific time (t) within which dead-reckoning and ephemeris information are relatively accurate. The distances are compared with the pseudoranges obtained by the GNSS reception unit 100 using the signal measurement values, so that whether an error in each satellite has increased may be monitored, and thus it may always be monitored whether errors have occurred in the satellites and whether ambiguities have increased due to the errors.

Hereinafter, embodiments of the present invention will be described in detail with reference to the attached drawings. It should be noted that the same reference numerals are used throughout the different drawings to designate the same components or parts. In the following description of the present invention, detailed descriptions of related known functions or configurations which have been deemed to make the gist of the present invention unnecessarily obscure will be omitted below.

FIG. 3 is a configuration diagram showing a system for detecting ambiguities in satellite signals for vessel positioning according to the present invention.

As shown in FIG. 3, the system for detecting ambiguities in satellite signals for vessel positioning according to the present invention includes a Global Navigation Satellite System (GNSS) reception unit 100, a vessel position calculation unit 200, a distance calculation unit 300, and an error monitoring unit 400.

The GNSS reception unit 100 may acquire the vessel position of a vessel using a plurality of satellites.

The vessel position calculation unit 200 may calculate the second vessel position of the vessel after a specific time (t) has elapsed, from the first vessel position of the vessel, by using dead-reckoning.

FIG. 4 is a diagram showing the positions of a vessel and satellites before and after a specific time (t) elapses according to the present invention.

As shown in FIG. 4, the vessel may sail between a first vessel position (a) and a second vessel position (b) during the specific time (t). At the first vessel position (a), a GNSS position may be acquired using the positions $S_{1a}$, $S_{2a}$, $S_{3a}$, and $S_{4a}$ of satellites and at the second vessel position (b), a GNSS position may be acquired using the positions $S_{1b}$, $S_{2b}$, $S_{3b}$, and $S_{4b}$ of the satellites after the respective satellites have moved along designated orbits (ephemerides) during the specific time (t).

The vessel position calculation unit 200 may calculate the second vessel position (b) using the bow azimuth angle and ground speed of the vessel from the first vessel position (a).

Here, as described above, the first vessel position (a) denotes the GNSS position previously acquired using the satellite position values $S_{1a}$, $S_{2a}$, $S_{3a}$, and $S_{4a}$ when the GNSS reception unit 100 is placed at the first vessel position (a). The bow azimuth angle and the ground speed are values respectively measured by a direction sensor and a speed sensor included in the vessel.

Since the GNSS reception 100 receives the orbit (ephemeris) information of each vessel, the precision of which is valid for a predetermined period of time longer than the specific time (t) (several hours or more), from individual satellites, and maintains the ephemeris information, it may immediately calculate positions to which the respective satellites have moved during the specific time (t). This shows that, when the positions $S_{1a}$, $S_{2a}$, $S_{3a}$, and $S_{4a}$ in FIG. 4 are the positions of respective satellites acquired by receiving satellite signals, the positions $S_{1b}$, $S_{2b}$, $S_{3b}$, and $S_{4b}$ denote values obtained by calculating distances that the satellites have moved during the specific time (t), using the ephemeris information of the corresponding satellites.

Generally, when unknown error factors increase in measurement values received from the satellites due to natural or artificial interference factors upon vessel positioning using the GNSS in the vessel, ambiguities are also increased. Such ambiguities may be monitored using dead-reckoning based on the bow azimuth angle and the ground speed that may always be acquired from the vessel at regular intervals of a specific time (t) corresponding to a relatively short period ranging from several seconds to several minutes.

The distance calculation unit 300 may calculate predicted distances between the respective satellites and the vessel using the position values $S_{1b}$, $S_{2b}$, $S_{3b}$, and $S_{4b}$ of the respective satellites at the second vessel position (b), calculated using the ephemeris information of the satellites, and a position value of the second vessel position (b).

Here, as described above, the position values $S_{1b}$, $S_{2b}$, $S_{3b}$, and $S_{4b}$ of the respective satellites at the second vessel position (b) are values obtained by the GNSS reception unit 100 calculating the distance values of respective satellites that have moved from the first vessel position during the specific time (t), using the ephemeris information of the satellites.

The error monitoring unit 400 may individually compare the predicted distances between the respective satellites and the vessel, which are calculated by the distance calculation unit 300, with pseudoranges between the respective satellites and the GNSS reception unit 100 at the second vessel position (b), and may monitor whether errors have occurred in the respective satellites depending on whether an error in each satellite has increased. Here, the pseudoranges may be values calculated by the GNSS reception unit 100 using signal measurement values.

That is, in accordance with the present invention, distances between the satellites and the vessel are obtained by respectively calculating the positions of the satellites and the vessel using dead-reckoning and ephemeris information during the specific time (t) within which dead-reckoning and ephemeris information are relatively accurate. The distances are compared with the pseudoranges obtained by the GNSS reception unit 100 using the signal measurement values, so that whether an error in each satellite has increased may be monitored, and thus it may always be monitored whether errors have occurred in the satellites and whether ambiguities have increased due to the errors.

Hereinafter, a method for detecting ambiguities in satellite signals for vessel positioning according to the present invention will be described.

Figure 5:
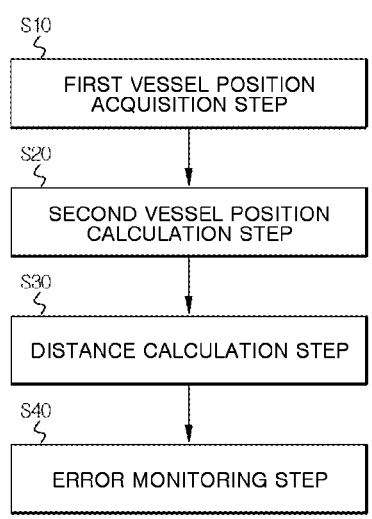
FIG. 5 is a flowchart showing a method for detecting ambiguities in satellite signals for vessel positioning according to an embodiment of the invention.

FIG. 5 is a flowchart showing a method for detecting ambiguities in satellite signals for vessel positioning according to the present invention.

As shown in FIG. 5, the method for detecting ambiguities in satellite signals for vessel positioning according to the present invention includes first vessel position acquisition step S10, second vessel position calculation step S20, distance calculation step S30, and error monitoring step S40.

As shown in FIG. 4, the first vessel position acquisition step S10 is the step of acquiring a first vessel position (a) using a plurality of satellites.

More specifically, at the first vessel position acquisition step S10, the first vessel position (a) may be acquired by the following Equation 1:

$$VP_a(T) = TA(\rho_{1a}, \rho_{2a}, \rho_{3a}, \rho_{4a}) \quad \text{Equation 1}$$

where $VP_a(T)$ denotes the position of the vessel at point 'a', T denotes a time axis, TA denotes an abbreviated form of triangulation, meaning a function of receiving four pseudorange parameters and obtaining the position of the vessel from known satellite positions, and ($\rho_{1a}$, $\rho_{2a}$, $\rho_{3a}$, $\rho_{4a}$) denotes pseudoranges from point 'a' to the respective satellites.

The second vessel position calculation step S20 is the step of calculating the second vessel position (b) of the vessel after the specific time (t) has elapsed from the first vessel position (a), using dead-reckoning.

More specifically, at the second vessel position calculation step S20, the second vessel position may be calculated by the following Equation 2:

$$VP_{DR}(T+t) = DR\{VP_a(T), HDG_a, SOG_a\} \quad \text{Equation 2}$$

where $VP_{DR}(T+t)$ denotes the position of the vessel at point 'b' to which the vessel has moved for the time t, via dead-reckoning, T denotes a time axis, DR denotes an abbreviated form of dead-reckoning, meaning a function of calculating the position of the vessel after time t has elapsed, using input parameter values, $VP_a(T)$ denotes the position of the vessel at point 'a', $HDG_a$ denotes a bow azimuth angle at point 'a', and $SOG_a$ denotes a ground speed at point 'a'.

The distance calculation step S30 is the step of calculating predicted distances between the respective satellites and the vessel at the second vessel position (b) using the ephemeris information of the satellites.

Figure 6:
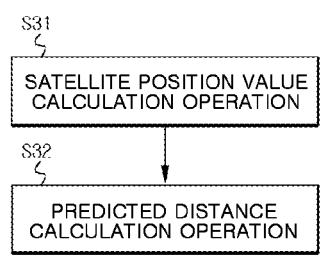
FIG. 6 is a flowchart showing the distance calculation step of the method for detecting ambiguities in satellite signals for vessel positioning according to an embodiment of the invention.

FIG. 6 is a flowchart showing the distance calculation step of the method for detecting ambiguities in satellite signals for vessel positioning according to the present invention.

As shown in FIG. 6, the distance calculation step S30 includes satellite position value calculation operation S31 and predicted distance calculation operation S32.

The satellite position value calculation operation S31 is the operation of calculating the position values $S_{1b}$, $S_{2b}$, $S_{3b}$, and $S_{4b}$ of the respective satellites at the second vessel position (b) using the ephemeris information of the satellites.

The predicted distance calculation operation S32 is the operation of calculating predicted distances between the respective satellites and the vessel using the satellite position values $S_{1b}$, $S_{2b}$, $S_{3b}$, and $S_{4b}$ at the second vessel position (b) and a position value of the second vessel position (b).

More specifically, in the predicted distance calculation operation S32, the predicted distances may be calculated by the following Equation 3:

$$Cal_{\rho 1,2,3,4b} = \sqrt{|VP_{DR}(T+t) - S_{1,2,3,4b}|^2} \quad \text{Equation 3}$$

where $Cal_{\rho 1,2,3,4b}$ denotes distances from the vessel to respective satellites at point 'b', $VP_{DR}(T+t)$ denotes the position of the vessel at point 'b' to which the vessel has moved for the time t, using dead-reckoning, T denotes a time axis, and $S_{1,2,3,4b}$ denotes the calculated position values of the respective satellites at point 'b'.

The error monitoring step S40 is the step of comparing the predicted distances between the respective satellites and the vessel with the pseudoranges between the respective satellites and the GNSS reception unit at the second vessel position (b), and then monitoring whether errors have occurred in satellite signals depending on whether an error in each satellite has increased.

Figure 7:
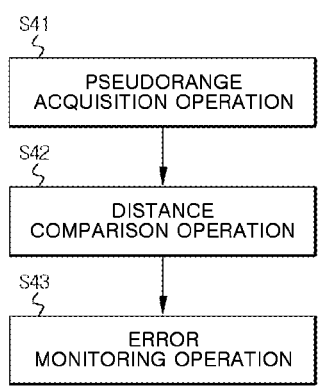
FIG. 7 is a flowchart showing the error monitoring step of the method for detecting ambiguities in satellite signals for vessel positioning according to an embodiment of the invention.

FIG. 7 is a flowchart showing the error monitoring step of the method for detecting ambiguities in satellite signals for vessel positioning according to the present invention.

As shown in FIG. 7, the error monitoring step S40 includes pseudorange acquisition operation S41, distance comparison operation S42, and error monitoring operation S43.

The pseudorange acquisition operation S41 is the operation of acquiring the pseudoranges between the respective satellites and the vessel at the second vessel position (b).

More specifically, in the pseudorange acquisition operation S41, the pseudoranges may be acquired by the following Equation 4 which represents the vessel position $VP_b(T+t)$ corresponding to the second vessel position (b) by a formula of distances between the vessel and the satellites:

$$VP_b(T+t) = TA(\rho_{1b}, \rho_{2b}, \rho_{3b}, \rho_{4b}) \quad \text{Equation 4}$$

where $VP_b(T+t)$ denotes the position of the vessel at point 'b', T denotes a time axis, TA denotes an abbreviated form of triangulation, meaning a function of receiving four pseudorange parameters and obtaining the position of the vessel from known satellite positions, and $(\rho_{1b}, \rho_{2b}, \rho_{3b}, \rho_{4b})$ denotes pseudoranges from point 'b' to the respective satellites.

The distance comparison operation S42 is the operation of individually comparing the predicted distances between the satellites and the vessel with the pseudoranges.

The error monitoring operation S43 is the operation of monitoring whether errors have occurred in the satellites depending on whether an error in each satellite has increased.

As described above, although the system and method for detecting ambiguities in satellite signals for vessel positioning according to the present invention have been described with reference to the illustrated drawings, the present invention is not limited by the embodiments disclosed in the present specification and the drawings, and it is apparent that the present invention can be modified in various forms by those skilled in the art without departing from the technical spirit of the present invention.

As described above, the present invention may compare the orbit information (ephemeris information) of GNSS satellites with dead-reckoning data obtained using the direction sensor and speed sensor of a vessel, so that ambiguities that can be contained in vessel position information and that represent a high potential risk may always be monitored, and ambiguities that can be contained in satellite signals themselves may be detected via such monitoring, thus enabling the present invention to be more effectively used for the position measurement fields of vessels.

The invention claimed is:

1. A system for detecting ambiguities in satellite signals for vessel positioning, comprising:
   a Global Navigation Satellite System (GNSS) reception unit for acquiring a position of a vessel using a plurality of satellites;
   a vessel position calculation unit for calculating a second vessel position of the vessel after a specific time (t) has elapsed from a first vessel position of the vessel, using dead-reckoning;
   a distance calculation unit for calculating predicted distances between the respective satellites and the vessel, using position values of the respective satellites at the second vessel position, calculated using ephemeris information of the satellites, and a position value of the second vessel position; and
   an error monitoring unit for individually comparing the predicted distances between the respective satellites and the vessel calculated by the distance calculation unit, with pseudoranges between the respective satellites and the GNSS reception unit at the second vessel position, and then monitoring whether errors have occurred in the satellites depending on whether an error in each satellite has increased.

2. The system of claim 1, wherein the vessel position calculation unit calculates the second vessel position using a bow azimuth angle and a ground speed of the vessel from the first vessel position.

3. The system of claim 2, wherein the vessel comprises:
   a direction sensor for measuring the bow azimuth angle; and
   a speed sensor for measuring the ground speed.

4. The system of claim 2, wherein the first vessel position is a GNSS position previously acquired using the position values of the respective satellites when the GNSS reception unit is located at a point corresponding to the first vessel position.

5. The system of claim 1, wherein the position values of the satellites at the second vessel position are acquired by the GNSS reception unit calculating distance values of respective satellites that have moved from the first vessel position during the specific time (t) using the ephemeris information of the satellites.

6. The system of claim 1, wherein the pseudoranges are values calculated by the GNSS reception unit using signal measurement values.

7. A method for detecting ambiguities in satellite signals for vessel positioning, comprising:
   acquiring a first vessel position of a vessel using a plurality of satellites;
   calculating a second vessel position of the vessel after a specific time (t) has elapsed from the first vessel position, using dead-reckoning;
   calculating predicted distances between the respective satellites and the vessel at the second vessel position using ephemeris information of the satellites; and
   monitoring whether errors have occurred in satellite signals depending on whether an error in each satellite has increased by individually comparing the predicted distances between the respective satellites and the vessel with pseudoranges between the respective satellites and a Global Navigation Satellite System (GNSS) reception unit at the second vessel position.

8. The method of claim 7, wherein acquiring the first vessel position is configured to acquire the first vessel position using the following equation:

$$VP_a(T)=TA(\rho_{1a},\rho_{2a},\rho_{3a},\rho_{4a})$$

where $VP_a(T)$ denotes the position of the vessel at point 'a', T denotes a time axis, TA denotes an abbreviated form of triangulation, meaning a function of receiving four pseudorange parameters and obtaining the position of the vessel from known satellite positions, and ($\rho_{1a}$, $\rho_{2a}$, $\rho_{3a}$, $\rho_{4a}$) denotes pseudoranges from point 'a' to the respective satellites.

9. The method of claim 7, wherein calculating the second vessel position is configured to calculate the second vessel position using the following equation:

$$VP_{DR}(T+t)=DR\{VP_a(T),HDG_a,SOG_a\}$$

where $VP_{DR}(T+t)$ denotes the position of the vessel at point 'b' to which the vessel has moved for the time t, via dead-reckoning, T denotes a time axis, DR denotes an abbreviated form of dead-reckoning, meaning a function of calculating the position of the vessel after time t has elapsed, using input parameter values, $VP_a$(T) denotes the position of the vessel at point 'a', $HDG_a$ denotes a bow azimuth angle at point 'a', and $SOG_a$ denotes a ground speed at point 'a'.

10. The method of claim 7, wherein calculating the distance comprises:
    a satellite position value calculation operation of calculating position values of respective satellites at the second vessel position using the ephemeris information of the satellites; and
    a predicted distance calculation operation of calculating predicted distances between the respective satellites and the vessel using the position values of the respective satellites at the second vessel position and a position value of the second vessel position.

11. The method of claim 10, wherein the predicted distance calculation operation is configured to calculate the predicted distances using the following equation:

$$Cal_{\rho 1,2,3,4b}=\sqrt{|VP_{DR}(T+t)-S_{1,2,3,4b}|^2}$$

where $Cal_{\rho 1,2,3,4b}$ denotes distances from the vessel to the respective satellites at point 'b', $VP_{DR}(T+t)$ denotes the position of the vessel at point 'b' to which the vessel has moved for the time t, using dead-reckoning, T denotes a time axis, and $S_{1,2,3,4b}$ denotes the calculated position values of the respective satellites at point 'b'.

12. The method of claim 7, wherein monitoring whether errors have occurred comprises:
    a pseudorange acquisition operation of acquiring pseudoranges between the respective satellites and the vessel at the second vessel position;
    a distance comparison operation of individually comparing the predicted distances between the respective satellites and the vessel with the pseudoranges; and
    an error monitoring operation of monitoring whether errors have occurred in satellite signals depending on whether an error in each satellite has increased.

13. The method of claim 12, wherein the pseudorange acquisition operation is configured to acquire the pseudoranges using the following equation that represents a vessel position ($VP_b(T+t)$) corresponding to the second vessel position by a formula of distances between the vessel and the satellites:

$$VP_b(T+t)=TA(\rho_{1b},\rho_{2b},\rho_{3b},\rho_{4b})$$

where $VP_b(T+t)$ denotes the position of the vessel at point 'b', T denotes a time axis, TA denotes an abbreviated form of triangulation, meaning a function of receiving four pseudorange parameters and obtaining the position of the vessel from known satellite positions, and ($\rho_{1b}$, $\rho_{2b}$, $\rho_{3b}$, $\rho_{4b}$) denotes pseudoranges from point 'b' to the respective satellites.

* * * * *